United States Patent [19]

Hassenpflug et al.

[11] Patent Number: 4,766,767
[45] Date of Patent: Aug. 30, 1988

[54] METHOD FOR DETERMINING THE HORIZONTAL AIRSPEED OF HELICOPTERS IN HIGHER SPEED RANGES

[75] Inventors: Wolfgang Hassenpflug, Freiburg; Rainer Schwäble, Garbsen, both of Fed. Rep. of Germany

[73] Assignee: Litef GmbH, Freiburg im Breisgau, Fed. Rep. of Germany

[21] Appl. No.: 57,805

[22] Filed: Jun. 2, 1987

[30] Foreign Application Priority Data

Jun. 2, 1986 [EP] European Pat. Off. ............ 86107466

[51] Int. Cl.⁴ ............................................. G01C 21/10
[52] U.S. Cl. ................................... 73/181; 73/178 H; 364/443
[58] Field of Search .............. 73/178 H, 181; 364/443

[56] References Cited

U.S. PATENT DOCUMENTS

| | | | |
|---|---|---|---|
| 4,023,409 | 5/1977 | Durand | 73/178 H |
| 4,648,269 | 3/1987 | Durand | 73/178 H |
| 4,702,106 | 10/1987 | Hassenpflug et al. | 73/178 H |

FOREIGN PATENT DOCUMENTS 0094778 11/1983 European Pat. Off. .
2037688 7/1980 United Kingdom .

*Primary Examiner*—Donald O. Woodiel
*Attorney, Agent, or Firm*—Elliott N. Kramsky

[57] ABSTRACT

A method for determining the horizontal airspeed of a helicopter in the high speed ($v_e > 20$ m/s) range. Pitch angle and the longitudinal control signals are recorded by sensors such as an inertial navigation system and a potentiometer connected to the pilot's control lever. Equivalent speed signals are calculated from the measured pitch angle and longitudinal control signals by means of calibration equations. These signals are then filtered and weighted. The horizontal airspeed is then derived from the sum of the weighted signals divided by the sum of weighting factors $k_\theta$ and $k_{\delta x}$ determined in accordance with the sensed pitch angle and longitudinal control signals. The horizontal velocity signal may be filtered, if necessary.

7 Claims, 4 Drawing Sheets

METHOD FOR DETERMINING THE HORIZONTAL AIRSPEED OF HELICOPTERS IN HIGHER SPEED RANGES

BACKGROUND

1. Field of the Invention

The present invention relates to the measurement of helicopter airspeed. More particularly, this invention pertains to a method for determining the horizontal airspeed of helicopters traveling above 20 m/s.

2. Description of the Prior Art

Commonly owned and allowed United States patent application Ser. No. 872,044 of Hassenpflug, et al., filed June 6, 1986 for "Method For Determining the Horizontal Airspeed of Helicopters in Low Speed Ranges", now U.S. Pat. No. 4,702,106 proposes a method that relies upon analytical computation for determining helicopter airspeed at velocities below 20 m/s. The content of this application is hereby incorporated by reference.

Unlike previous measuring methods, particularly those that employ pitot-static tubes and a probe that is rotatable about two axes, the proposed method referenced above requires no external sensor. Such a sensor is readily subject to damage, or may fail completely, due to external effects. Further, pitot-static tubes require relatively high power (heating) and, together with the requisite measurement converters, present a significant weight factor. The sole requirement of the proposed method is the provision of measurement signal generators for the required control units.

The objective of the invention is to provide an analytical method of determining the horizontal airspeed of helicopters in higher velocity ranges, i.e. in ranges $v_e > 20$ m/s.

SUMMARY

The invention overcomes and addresses the shortcomings of the prior art insofar as the determination of the horizontal speed of helicopters in the higher speed ranges by providing a new method for determining the horizontal airspeed of helicopters at such speeds. Such method includes the determination of calibration equations for the functional relationship between airspeed and pitch angle and airspeed and longitudinal control during quasi-steady state flight of the helicopter in a the velocity range. These equations are then stored.

Pitch angle $\theta$ and longitudinal control $\delta x$ values of the helicopter are then measured and then recorded. Equivalent speed parameter signals $v_\theta$ and $v_{67}$ x are calculated by applying the pitch angle and longitudinal control values to the calibration equations. These signals are then filtered.

Weighting factors $k_\theta$ and $k_{\delta x}$ are determined in accordance with measurements of the sensors and then stored. The filtered signals are converted to weighted signals by means of the weighting factors. The horizontal airspeed signal is then determined as a function of the sum of the weighted pitch angle and longitudinal control signals divided by the sum of the weighting functions.

The foregoing features and advantages of this invention will become further apparent from the detailed description that follows. This description is accompanied by a set of drawing figures wherein numerals, corresponding to numerals of the written description, indicate the various features, like numerals referring to like features throughout.

DETAILED DESCRIPTION

The basic equation for the pitch motion of a helicopter (see for example Shape, N. K., "A Study of the Dynamic Motions of Hingeless Rotored Helicopters", New Jersey (USA), 1970 and Payne, P. R., "Helicopter Dynamics and Aerodynamics", Pitman & Sons, London 1959) is:

$$I_L \ddot{\theta} = F_s h \alpha + M \qquad (1.1a)$$

Where:

$I_1$ = moment of inertia of the helicopter, referred to the transverse axis of the body;
$\theta$ = pitch angle;
$F_s$ = rotor thrust;
$\alpha$ = inclination of the rotor plane;
h = distance between the center of gravity of the rotor and that of the helicopter; and
M = uncompensated perturbation moment.

The longitudinal force is given by the projection of $F_s$ onto the longitudinal axis. That is, $$-F_s(\theta + \alpha) = m\dot{v}_x + F_w \qquad (1.1b)$$

where $F_w$ is the aerodynamic drag.

If Equations (1.1a) and (1.1b) are referred to a known initial condition and only the deviations are considered, then $$I_L \Delta \ddot{\theta} = F_s \cdot h \cdot \Delta \alpha \qquad (1.2a)$$

$$-F_s(\Delta \theta + \Delta \alpha) = m \Delta \dot{v}_x + \Delta F_w \qquad (1.2b)$$

The angle $\Delta \alpha$ depends on the control input $\delta_x$ the longitudinal velocity $v_x$ and the pitch rate $\dot{\theta}$. Linearization gives a corresponding additive expression:

$$\Delta \alpha = c_v \Delta v_x + c_{\dot{\theta}} \Delta \dot{\theta} - D_{\delta x} \Delta \delta_x \qquad (1.3)$$

$$c_v = \frac{\partial \alpha}{\partial v_x}$$

$$c_{\dot{\theta}} = \frac{\partial \alpha}{\partial \dot{\theta}}$$

Where $D_{\delta}x$ = control transfer coefficient.

Substituting (1.3) into (1.2) gives $$I_L \Delta \ddot{\theta} - M_{\dot{\theta}} \Delta \dot{\theta} - M_v \Delta v_x = M_{\delta x} \Delta \delta_x \qquad (1.4a)$$

and the approximation $$\Delta F_w + m\Delta \dot{v}_x - D_v\Delta v_x = -F_s\Delta\theta, \quad (1.4b)$$

where $M_\theta = F_s \cdot h \cdot c_\theta =$ longitudinal inclination damping;
$M_v = F_s \cdot h \cdot c_v =$ velocity stability;
$M_x = -F_s \cdot h \cdot D_x =$ effectiveness of the longitudinal control;
$D_v = -F_s \cdot c_v =$ forward damping.

Finally, substituting $\Delta v_x$ into (1.4a) by (1.4b) gives $$I_L\Delta\ddot{\theta} - M_\theta\cdot\Delta\dot{\theta} + hF_s\Delta\theta = M_{\delta x}\Delta\delta_x - h\Delta F_w - h\cdot m\Delta\dot{v}_x. \quad (1.5)$$

The above is an inhomogeneous differential equation of the second order whose left-hand side characterizes the pitch oscillation behavior of the helicopter. The perturbation function (right-hand side) consists of three terms. Two ($-h\,\Delta F_w$ and $-hm\,\Delta\dot{v}_x$) characterize external perturbations caused by wind fluctuations while $M_{\delta x}\Delta\delta_x$ gives the effect of the longitudinal control.

Figure 1:
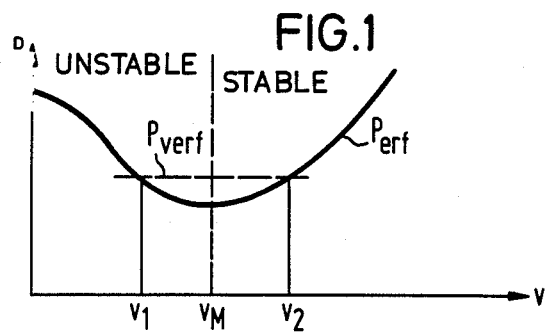
FIG. 1 is a diagrammatic curve of a helicopter power profile.

Helicopter stability conditions may be indicated by means of a helicopter power profile such as that of FIG. 1. Such profile approximately describes a parabola having a minimum at $v_M \cong v_{max}/2$. For a specified power there exist exactly two velocities $v_1$ and $v_2$ for which the helicopter is in a state of equilibrium. Assuming that the helicopter experiences an aero-dynamic perturbation during steady state flight at $v_2$ (the sign of the perturbation indicates either an increase or a reduction of the required power), the helicopter will exhibit a tendency to reassume the old condition because no power reserve is available. In the other case, the surplus power will cause an increase in velocity until $v_2$ is again reached. It is possible to deduce from this that th oscillation behavior of the system (Equation 1.5) is stable for $v > v_M$. (The pilot makes corrections with the longitudinal control in both cases to avoid excessively large deviations of longitudinal inclination.)

Other conditions exist in the velocity range $v < v_M$. In this range, where the available power is greater than necessary, the helicopter continues to accelerate—as a result of the increasing surplus power—until equilibrium position $v_2$ is attained. Thus, in this case, there is no automatic return to the initial condition and the perturbation is instead escalated. The same effect occurs with a reversal of sign (i.e. when the available power is less than required). In that case, velocity continues to decrease unless the pilot counters the perturbation motion by steering against it. It follows that instability is present at speeds below $v_M$.

The essential result of the above considerations is that wind-induced perturbations are compensated in every flight attitude by immediately controlling against them. A model of the method according to the invention for determining helicopter airspeed $v_e > 20$ m/s is described in more detail below.

In steady state horizontal flight, the acting Longitudinal force is approximately $$F_s\cdot\sin\theta = F_w \quad (2.1)$$

Figure 2:
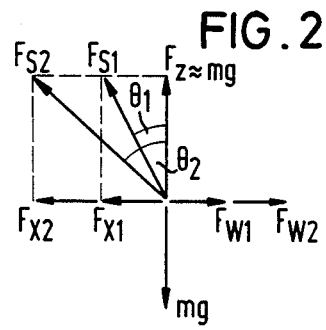
FIG. 2 is a vector diagram for illustrating the longitudinal forces that act on a helicopter during steady state forward flight.

The pitch angle is indicated by $\theta$. Ignoring negligible quantities, this angle is identical to the angle by which the thrust component $F_s$ must be inclined forward to overcome fuselage drag $F_w$. The fuselage drag, and hence the product $F_s\cdot\sin\theta$, is a variable that depends on the square of the speed. Since the vertical component $F_z$ does not vary with horizontal velocity, a change in the longitudinal force always requires a change in pitch angle. FIG. 2, a vector diagram of the longitudinal forces that act on a helicopter during steady state forward flight, demonstrates the preceding for two different speeds. It is therefore possible to determine airspeed helicopter from pitch angle.

Figure 5:
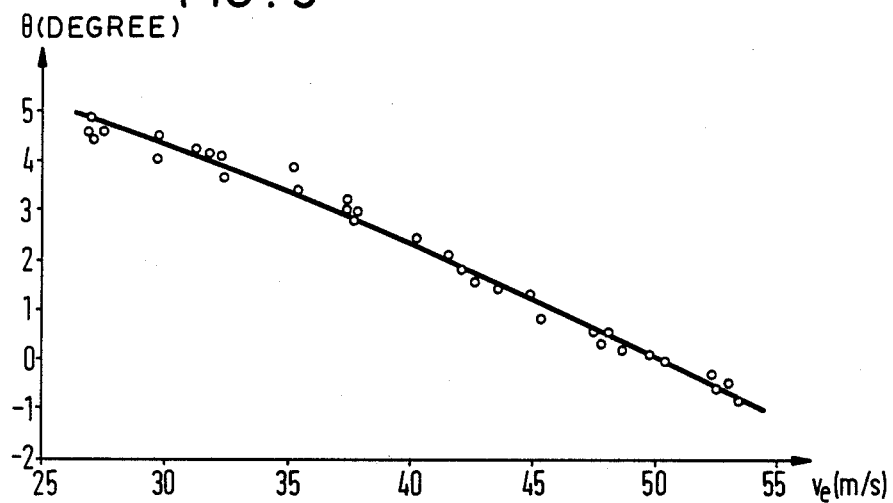
FIG. 5 is a graphical representation of the relationship between pitch angle and velocity.

FIG. 5 is a graphical representation of the relationship between the two measured parameters, pitch angle $\theta$ and airspeed $v_e$, derived form flight tests of a known helicopter. As seen, pitch angle sensitivity below 20 m/s is very small but above 20 m/s it is sufficient to provide an unambiguous relationship to the airspeed $v_e$.

Direct application of the above function only provides usable results when homogeneous incident flow conditions are present, a condition that does not, of course, correspond to reality. Continuous aerodynamic perturbations cause oscillation (i.e. oscillation about a mean pitch angle in steady state flight) of helicopter motion in accordance with Equation (1.5).

Figure 3:
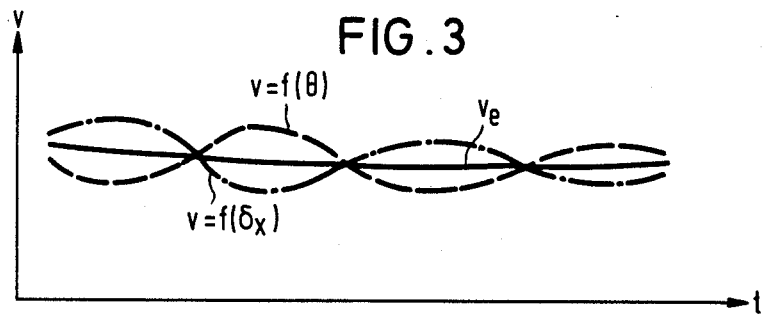
FIG. 3 is a diagram that illustrates the time variations of pitch motion and the opposing control signal for a helicopter in quasi-steady flight.
Figure 6:
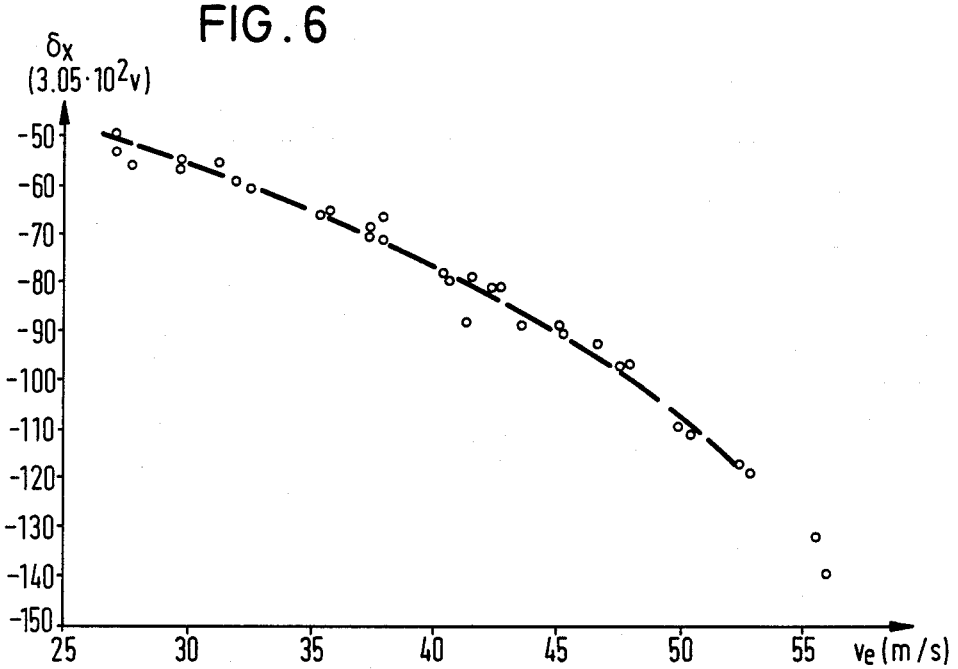
FIG. 6 is a graphical representation of the relationship between control deflection signal and velocity.

As stated, pitch motions due to aerodynamic perturbations are corrected in both stable and unstable regimes by opposing control motions. FIG. 6, a graphical representation of the relationship between control deflection signal and velocity, shows that for $v_e > 25$ m/s, longitudinal control deflection can be represented as a function of speed. A common scale for the longitudinal control $\delta x$ and the pitch motion $\theta$ permits comparison of the amplitudes of the two signals by appropriate calibration functions. (The pitch angle $\theta$ represents an output signal whereas the longitudinal control signal $\delta x$ is an input). Experience and measured observations have shown that, when the pilot becomes aware of the pitch motion, he controls against it in rhythm with the oscillation as is shown in FIG. 3.

Thus in the case of steady state flight, the following expression can be derived:

$$v_e = \frac{k_\theta v_\theta + k_{\delta x}v_{\delta x}}{k_\theta + k_{\delta x}} \quad (2.2)$$

Where:

$\left.\begin{array}{l}v_\theta = f(\theta)\\ v_{\delta x} = f(\delta x)\end{array}\right\}$ Calibration equations $\left.\begin{array}{l}k_\theta\\ k_{\delta x}\end{array}\right\} =$ Weighting factors The longitudinal control signal $\delta x$ and the fuselage angular attitude or the pitch angle $\theta$, are recorded using appropriate measurement sensors. A possible sensor for the fuselage angular attitude or pitch angle $\theta$ is an inertial navigation system while the longitudinal control signal $\delta x$ may be recorded, for example, by a potentiometer on the pilot's control lever, as has already been proposed in the above-referenced U.S. patent application.

Depending upon the quality of the sensor or of the analog/digital conversion, it may be necessary to filter the individual signals so that, in general form, Equation (2.2) becomes $$v_e = f\left[\frac{k_\theta f(v_\theta) + k_{\delta x} f(v_{\delta x})}{k_\theta + k_{\delta x}}\right] \quad (2.3)$$

Figure 4:
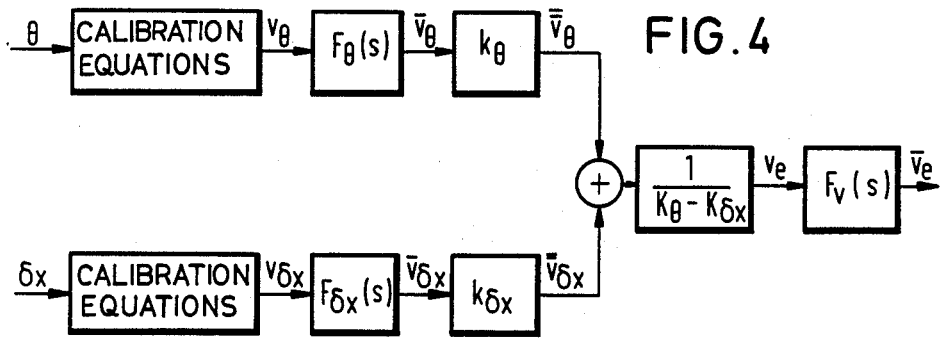
FIG. 4 is a block diagram of the method of the invention for determining horizontal airspeed.

FIG. 4 is a block diagram that illustrates the method of the invention for determining horizontal airspeed $v_e$. As indicated in the figure, the method includes the steps of recording the pitch angle $\theta$ and the longitudinal control signal $\delta x$ (by appropriate measurement sensors); calculating the equivalent velocities $v_\theta$ and $v_{67\,x}$ from $\theta$ and $\delta x$, respectively, by the calibration equations $f(\theta)$ and $f(\delta x)$; filtering the signals $v_{74}$ and $v_{\delta x} \rightarrow \bar{v}_\theta, \bar{v}_{\delta x}$; weighting the signals $\bar{v}_\theta$ and $\bar{v}_{\delta x} \rightarrow \bar{\bar{v}}_\theta, \bar{\bar{v}}_{\delta x}$; and associating the $\bar{\bar{v}}_\theta$ and $\bar{\bar{v}}_{\delta x}$ by forming the weighted mean:

$$v_e = \frac{\bar{\bar{v}}_\theta + \bar{\bar{v}}_{\delta x}}{k_\theta + k_{\delta x}}$$

Generally, depending on the quality of the analog/-digital conversion, it is also necessary to filter the $v_e$ signal to obtain the horizontal airspeed signal indicated by $\bar{v}_e$ in FIG. 4.

The above-referenced model of the method of the invention has been tested by a comprehensive series of aerodynamic flights employing a helicopter of known characteristics. During such tests, the pitch angle signal $\theta$ was recorded by an inertial navigation system and the longitudinal control signal $\delta x$ recorded by means of a control lever potentiometer. The GEC (Great Britain) product designated LASSIE (Low Air-Speed Sensing and Indicating Equipment), which operates without significant error in the velocity range $v_e > 20$ m/s (see Kaletka, J., "Evaluation of the Helicopter Low Airspeed System LASSIE" Rotorcraft and Powered Lift Aircraft Forum, Garmisch-Partenkirchen, 1981) provided the necessary speed reference.

Figure 7:
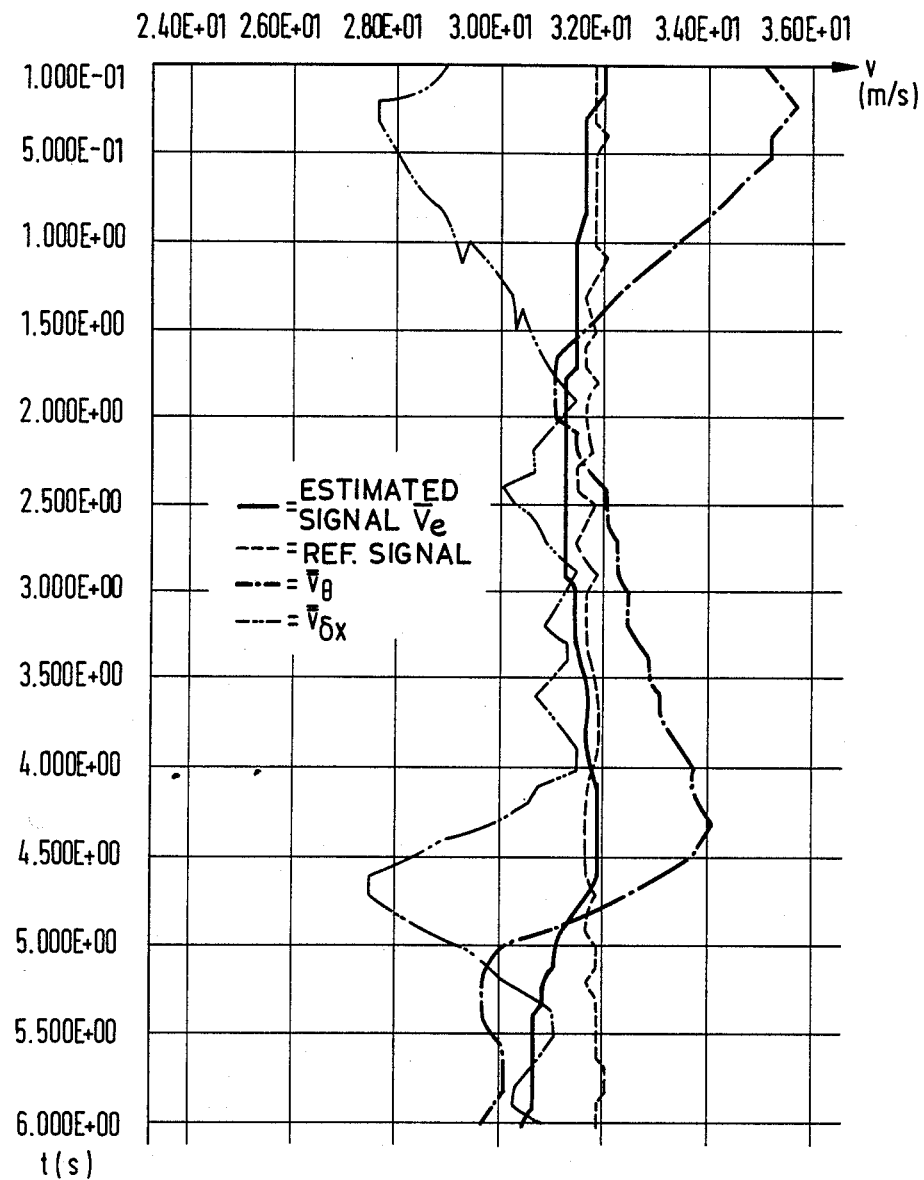
FIGS. 7 and 8 are graphical representations of flight test data wherein horizontal airspeed was determined in accordance with the method of the invention.
Figure 8:
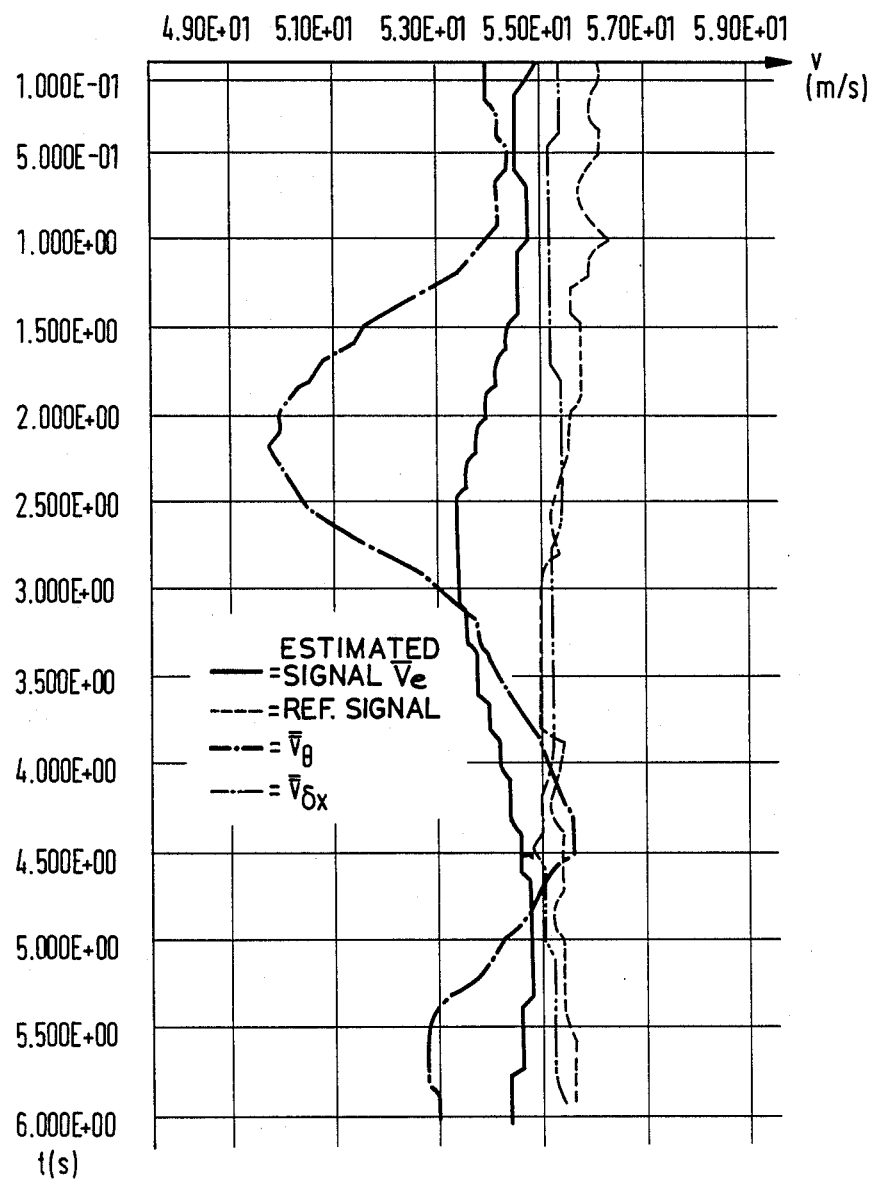

FIGS. 7 and 8 are graphical representations of data derived from representative flight tests as described above. Data for determining the calibration functions $v_\theta$ and $v_{\delta x}$ (characteristic for each type of helicopter) result from a series of quasi-steady state flights. An average taken over a measurement interval of between 10 and 20 seconds forms one measured value in each case. By utilizing a scanning frequency of 10 Hz, in each case between one and two hundred measured values are thus available. FIG. 5 is a graphical representation of the relationship between pitch angle and velocity. Such data shows the result of the averaged data for the pitch angle $\theta$ just as FIG. 6 shows the averaged data for the control deflections (i.e. for the longitudinal control signal $\delta x$).

The values plotted in FIGS. 5 and 6 refer to the following actual data:

$\rho \simeq 0.144$ kg s$^2$/m$^4$ (density)
$m_H \simeq 2200$ kg (helicopter mass)
$\Delta x_s = +0.02$ m (forward center of gravity position)

Changes to the above values must be taken into account by expressing the equations for $v_\theta$ and $v_{\delta x}$ in terms of appropriate parameters. In the instant case, the resulting equations are $$v_\theta = f(\theta) = a_0 + a_1\theta + a_2\theta^2 \quad (3.a)$$

$$v_{\delta x} = f(\delta x) = b_0 + b_1\delta_x + b_2\delta_x^2 \quad (3.b)$$

Where the coefficients are characteristic of the helicopters used in the tests.
$a_0 = 50.05$
$a_1 = -4.158$
$a_2 = -0.143$
$b_0 = -9.868$
$b_1 = -0.870$
$b_2 = -0.0029$ Using Equation (3.a/b) and the following parameter values that are typical for helicopters.

$k_\theta = 1$
$k_{\delta x} = 1$
$F_\theta(s) = 1$
$F_{\delta x}(s) = \dfrac{1}{1 + 0.2s}$
$F_V(s) = \dfrac{1}{1 + 0.1s}$ Airspeed over individual flight phases has been analytically determined in accordance with the abovedescribed method of the invention as set forth and explained with reference to FIG. 4. The plotted results are set forth (two examples) in FIGS. 7 and 8, the horizontal airspeed $v_e$ being approximately 32 m/s in the case of FIG. 7 and approximately 56 m/s in the case of the measurements on which FIG. 8 is based.

An empirical standard deviation of 1.1 m/s and 2.2 m/s at 95% reliability was determined from the totality of the test flights. The results show that, using the method according to the invention, the horizontal airspeed $v_e$ of helicopters can be determined, even in the higher velocity ranges, from the computational processing of just two measurements.

Thus it is seen that it is possible, by employing the teachings of the invention to determine the airspeed of a helicopter analytically from the measured pitch angle over a substantial range of the helicopter power profile. By utilizing the method of the invention one can obtain an analytical solution which omits the conventional differential pressure measurement required by existing methods for determining velocity. As disclosed above, the model that is incorporated into the method of the invention is based upon the characteristic oscillation behaviors of the helicopter. Such method, as shown in the data displayed above, is capable of determining horizontal airspeed with an accuracy of $\pm 2$ m/s ($2\sigma$) in the range $v_e > 20$ m/s.

While this invention has been disclosed in terms of its presently preferred embodiment, it is by no means limited thereto. Rather, the scope of this invention is only limited insofar as defined by the following set of claims and includes all equivalents thereof.

What is claimed is:

1. A method for determining the horizontal airspeed of a helicopter in the higher speed range comprising the steps of:
   (a) determining calibration equations for the functional relationship between airspeed and pitch angle and airspeed and longitudinal control during quasi-steady state flight of said helicopter in said velocity range; then
   (b) storing said equations; then
   (c) measuring pitch angle and longitudinal control $\delta x$ values of said helicopter by means of sensors; then (d) recording said values, then
(e) calculating equivalent speed parameter signals $v_\theta$ and $v_{\delta x}$ by applying said pitch angle and longitudinal control values to said calibration equations; then
(f) filtering said signals to produce $\bar{v}_\theta$ and $v_{\delta x}$; and
(g) determining weighting factors $k_\theta$ and $k_{\delta x}$ in accordance with measurements of said sensors; then
(h) storing said weighting factors; then
(i) converting said filtered signals to weighted signals by means of said weighting factors; and then
(j) determining a horizontal airspeed signal as a function of the sum of said weighted pitch angle $v_\theta$ and longitudinal control $v_{\delta x}$ signals divided by the sum of said weighing factors $k_\theta$ and $k_{\delta x}$.

2. A method as defined in claim 1 further including the step of filtering said horizontal airspeed signal.

3. A method as defined in claim 2 wherein said pitch angle signal is provided by an inertial navigation system.

4. A method as defined in claim 2 wherein said longitudinal control signal is generated by a potentiometer connected to a pilot's control lever.

5. A method as defined in claim 1 wherein said pitch angle signal is provided by an inertial navigation system.

6. A method as defined in claim 3 wherein said longitudinal control signal is generated by a potentiometer connected to a pilot's control lever.

7. A method as defined in claim 1 wherein said longitudinal control signal is generated by a potentiometer connected to a pilot's control lever.

* * * * *